(12) United States Patent
Donelson

(10) Patent No.: US 9,879,387 B2
(45) Date of Patent: Jan. 30, 2018

(54) SURFACING SYSTEM AND METHOD

(71) Applicant: Donelson Construction Co., LLC, Clever, MO (US)

(72) Inventor: Michael James Donelson, Springfield, MO (US)

(73) Assignee: DONELSON CONSTRUCTION CO., LLC, Clever, MO (US)

( * ) Notice: Subject to any disclaimer, the term of this patent is extended or adjusted under 35 U.S.C. 154(b) by 0 days.

(21) Appl. No.: 15/042,966

(22) Filed: Feb. 12, 2016

(65) Prior Publication Data

US 2016/0160453 A1 Jun. 9, 2016

Related U.S. Application Data

(63) Continuation-in-part of application No. 14/271,236, filed on May 6, 2014, now Pat. No. 9,260,826.

(51) Int. Cl.
*E01C 7/18* (2006.01)
*E01C 19/17* (2006.01)
(Continued)

(52) U.S. Cl.
CPC .............. *E01C 19/174* (2013.01); *E01C 7/18* (2013.01); *E01C 7/187* (2013.01); *E01C 7/24* (2013.01); *E01C 7/262* (2013.01); *E01C 7/30* (2013.01); *E01C 7/353* (2013.01); *E01C 11/24* (2013.01); *E01C 19/02* (2013.01); *E01C 19/12* (2013.01); *E01C 19/16* (2013.01); *E01C 19/176* (2013.01); *E01C 19/178* (2013.01); *E01C 19/21* (2013.01); *E01C 19/22* (2013.01); *E01C 23/06* (2013.01); *E01C 23/14* (2013.01); *E01C 2301/02* (2013.01)

(58) Field of Classification Search
CPC ... E01C 7/18; E01C 7/24; E01C 7/262; E01C 7/30; E01C 11/24; E01C 19/02; E01C 19/22; E01C 19/174; E01C 19/176
USPC .................................. 404/75, 84.05, 101–111
See application file for complete search history.

(56) References Cited

U.S. PATENT DOCUMENTS 1,914,950 A * 6/1933 Kanen .................... E01C 19/178
                                                              404/111
2,741,788 A * 4/1956 Shey ......................... A47L 13/12
                                                                15/105
(Continued)

FOREIGN PATENT DOCUMENTS

GB          2420144 A      5/2006

OTHER PUBLICATIONS

International Search Report and Written Opinion for related Application No. PCT/US2017/017345, dated Jun. 9, 2017, 13pps.

*Primary Examiner* — Raymond W Addie
(74) *Attorney, Agent, or Firm* — Armstrong Teasdale LLP

(57) ABSTRACT

A system for re-surfacing a pavement surface includes a conduit configured to transfer a spreadable material and a material application and dispersal device (MADD) coupled in flow communication with the conduit. The MADD includes at least one material application mechanism (MAM) coupled in flow communication with the conduit. The system also includes a pressurization device coupled in flow communication with the conduit and the MADD. The pressurization device is configured to channel the spreadable material into the at least one MAM and to generate a positive pressure within the at least one MAM to facilitate delivering the spreadable material to the pavement surface.

75 Claims, 12 Drawing Sheets

FIG. 3

(51) Int. Cl.
*E01C 7/30* (2006.01)
*E01C 7/24* (2006.01)
*E01C 7/26* (2006.01)
*E01C 11/24* (2006.01)
*E01C 19/02* (2006.01)
*E01C 19/22* (2006.01)
*E01C 7/35* (2006.01)
*E01C 19/12* (2006.01)
*E01C 19/16* (2006.01)
*E01C 19/21* (2006.01)
*E01C 23/06* (2006.01)
*E01C 23/14* (2006.01)

(56) References Cited

U.S. PATENT DOCUMENTS

| | | | | |
|---|---|---|---|---|
| 3,283,675 | A * | 11/1966 | Gifford | E01C 19/16 15/50.1 |
| 3,841,779 | A * | 10/1974 | Ray | E01C 19/178 404/111 |
| 4,311,274 | A * | 1/1982 | Neal | B05B 9/0409 239/1 |
| 4,364,690 | A | 12/1982 | Bruns | |
| 4,557,626 | A | 12/1985 | McKay et al. | |
| 4,789,265 | A * | 12/1988 | Wilson | E01C 11/005 118/108 |
| 4,854,770 | A * | 8/1989 | Puchala | E01C 23/128 299/17 |
| 4,917,533 | A | 4/1990 | Wilson | |
| 4,944,632 | A * | 7/1990 | Dillingham | E01C 23/06 404/101 |
| 4,958,955 | A | 9/1990 | Laditka | |
| 5,222,828 | A * | 6/1993 | Magalski | E01C 19/238 180/20 |
| 5,232,306 | A * | 8/1993 | Sterner | E01C 23/06 404/107 |
| 5,302,051 | A * | 4/1994 | Wilson, Sr. | E04F 21/241 404/103 |
| 5,325,994 | A * | 7/1994 | Mizialko | E01C 23/0973 222/113 |
| 5,518,544 | A * | 5/1996 | Higginson | B26D 1/405 118/315 |
| 5,735,634 | A | 4/1998 | Ulrich et al. | |
| 5,765,963 | A * | 6/1998 | Roberts | E01C 19/16 404/101 |
| 5,807,022 | A * | 9/1998 | McCleary | E04F 21/241 404/101 |
| 5,895,173 | A * | 4/1999 | O'Brien | E01C 19/21 404/108 |
| 5,957,621 | A * | 9/1999 | Clark, Jr. | E01C 19/174 239/159 |
| 6,619,880 | B1 * | 9/2003 | Jensen | E01H 3/02 141/105 |
| 6,918,714 | B2 * | 7/2005 | Chambard | E01C 19/176 404/111 |
| 7,033,106 | B2 | 4/2006 | Harvey | |
| 7,588,388 | B2 * | 9/2009 | Hall | E01C 19/176 404/101 |
| 7,641,420 | B2 * | 1/2010 | Becker | E01C 19/17 404/107 |
| 7,798,744 | B2 | 9/2010 | Larson et al. | |
| 7,802,941 | B2 | 9/2010 | Wingo et al. | |
| 2015/0322632 | A1 | 11/2015 | Donelson | |

* cited by examiner

SURFACING SYSTEM AND METHOD

CROSS-REFERENCE TO RELATED APPLICATIONS

This application is a continuation-in-part and claims priority to, U.S. patent application Ser. No. 14/271,236 filed on May 6, 2014 for "SURFACING SYSTEM AND METHOD", and issued as U.S. Pat. No. 9,260,826, which is hereby incorporated by reference in its entirety.

BACKGROUND OF THE DISCLOSURE

The field of the disclosure relates generally to pavement re-surfacing and, more particularly, to a method and systems for re-surfacing a pavement surface using a material dispersal and application device.

Many roadways and other paved surfaces exhibit surface wheel-rutting and general degradation over time. Re-surfacing is a solution which improves skid resistance and the overall quality of these surfaces by applying a uniform layer of a re-surfacing material to the surface. Typically, the layer of re-surfacing material is applied to the surface using a truck, or other mobile device, as it travels along the surface. The re-surfacing material may typically include a slurry material, emulsion oil, and/or an aggregate. The choice of material and method of application may vary depending at least on the project and any desired or necessary characteristics of the re-surfaced pavement.

At least some known systems for pavement re-surfacing use a spray system to apply the re-surfacing material. A spray system is capable of applying a uniform layer of re-surfacing material to the roadway. However, spray systems are susceptible to clogging. For example, a spray system for re-surfacing using a re-surfacing material including aggregate that is sufficiently large may result in clogging of the spray system. In this example, clogging may be lessened by using a re-surfacing material having smaller aggregate. However, this imposes a limit on at least the functionality of the roadway.

BRIEF DESCRIPTION OF THE DISCLOSURE

In one aspect, a system for re-surfacing a pavement surface is provided. The system includes a conduit configured to transfer a spreadable material and a material application and dispersal device (MADD) coupled in flow communication with the conduit. The MADD includes at least one material application mechanism (MAM) coupled in flow communication with the conduit. The system also includes a pressurization device coupled in flow communication with the conduit and the MADD. The pressurization device is configured to channel the spreadable material into the at least one MAM and to generate a positive pressure within the at least one MAM to facilitate delivering the spreadable material to the pavement surface.

In another aspect, a material application dispersing device (MADD) for use with a re-surfacing system for re-surfacing a pavement surface is provided. The MADD includes a frame including at least one first support member and a plurality of second support members coupled to the at least one first support member. The MADD also includes at least one material application mechanism (MAM) coupled to the at least one first support member. The MAM includes a vessel having a plurality of walls that define a cavity and a bottom opening and an inlet coupled in flow communication with a source of spreadable material. The inlet is configured to channel the spreadable material to the cavity such that a positive pressure is generated within the cavity to facilitate delivering the spreadable material through the bottom opening to the pavement surface.

In yet another aspect, a method for re-surfacing a pavement surface using a pavement resurfacing device is provided. The method applying a first spreadable material to the pavement surface using a first delivery mechanism of the pavement resurfacing device. The first spreadable material is then dispersed on the pavement surface using a first dispersing bar of the pavement resurfacing device. The first dispersing bar is configured to apply substantially uniform pressure across the pavement surface. The method also includes applying a second spreadable material to the first spreadable material on the pavement surface using a second delivery mechanism of the pavement resurfacing device.

In yet another aspect, a method for re-surfacing a pavement surface is provided. The method includes applying a first spreadable material to the pavement surface using a first delivery mechanism and dispersing the first spreadable material on the pavement surface using a first dispersing bar. The first spreadable material is dispersed within a range of approximately less than 1 second to approximately 2 minutes after applying the first spreadable material. The method also includes applying a second spreadable material to the first spreadable material on the pavement surface using a second delivery mechanism. The second spreadable material is applied within a range of approximately less than 1 second to approximately 2 minutes after dispersing the first spreadable material.

DETAILED DESCRIPTION OF THE DISCLOSURE

Figure 1:
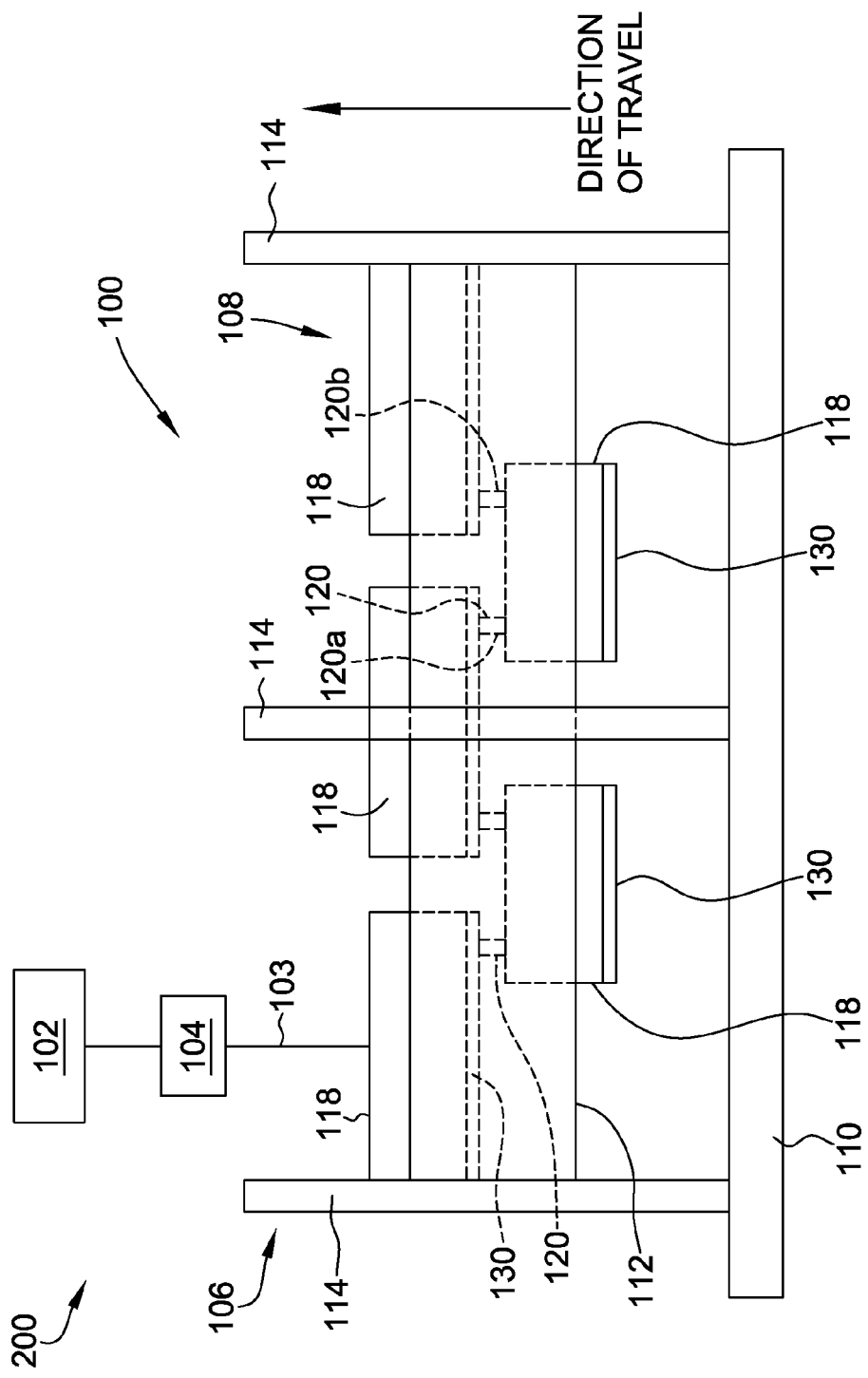
FIG. 1 is a schematic top view of an exemplary material application and dispersal device having a plurality of exemplary material application mechanisms for use in a re-surfacing system.

The apparatus, systems, and methods herein describe resurfacing of a pavement surface. More specifically, the apparatus, systems, and methods described herein are designed to re-surface a pavement surface with a material application and dispersal device (MADD) by applying a first material with a first delivery mechanism of the MADD, then dispersing the first material with a first dispersing device of the MADD either simultaneously or within seconds of applying the first material. The apparatus, systems, and methods described herein also include applying a second material to the first material using a second delivery mechanism of the MADD, then dispersing the second material with a second dispersing device of the MADD either simultaneously or within seconds of applying the second material.

As used herein, the term "slurry" describes a cold (ambient or low temperature) aggregate and bitumen blend. Such a slurry is conventionally compounded with water for effective mixing and may contain a catalyst or retarder to affect the composition's cure time, or other catalyst to aid in curing along with other additives.

Furthermore, the term "seal coat" describes a chip seal or a slurry using a fine aggregate.

Additionally, the term "microsurfacing" describes a chemically driven, typically quicker curing slurry composition.

Similarly, the term "emulsion oil" describes emulsified bitumen (asphalt), which is a combination of water, bitumen, and an emulsifier (soap) that allows homogenous compounding of the water and bitumen.

Moreover, the term "rejuvenator/rejuvenating material/ rejuvenating oil" describes the lighter oil fraction of asphalt bitumen. This lighter fraction is usually the first to be lost when exposed to the elements (i.e. sunlight, water, and oxygen). It is found advantageous to apply this material to the road surface by itself or in compound with straight (emulsified) bitumen, or other slurry type materials to replenish those lost light oils.

As used herein, the term "hot mix asphalt or asphaltic concrete" describes a hot aggregate and bitumen blend. This includes "warm mix" asphalt compositions. Similarly, the term "cold mix asphalt" describes a low or ambient temperature aggregate blended with bitumen. Typically, slurry seal and micro-surfacing fall into this category.

Finally, the term "chip seal surface" describes bitumen sprayed or otherwise applied onto a road surface and covered by aggregate to create a new wearing/driving surface.

As used herein, the term "delivery mechanism" describes any biased or unbiased device(s) or structure(s), or combination thereof that is the vehicle or pathway for a spreadable material to be transferred, or "delivered" from a source tank or mixing chamber to a pavement surface. The delivery mechanism(s) may be fully or partially enclosed to allow controllable flow of the spreadable material to the pavement surface. For instance, spreadable material that is applied onto a pavement surface, and spread across that surface with an auger or similar dispersing device, may be applied uniformly or not uniformly, depending upon desired results.

Furthermore, as used herein, the term "dispersing/dispersal mechanism/device/bar" describes any biased or unbiased device(s) or structure(s), or combination thereof that facilitates spreading the spreadable material into cracks formed in the pavement surface and/or into a generally uniform layer of material on the pavement surface.

Figure 2:
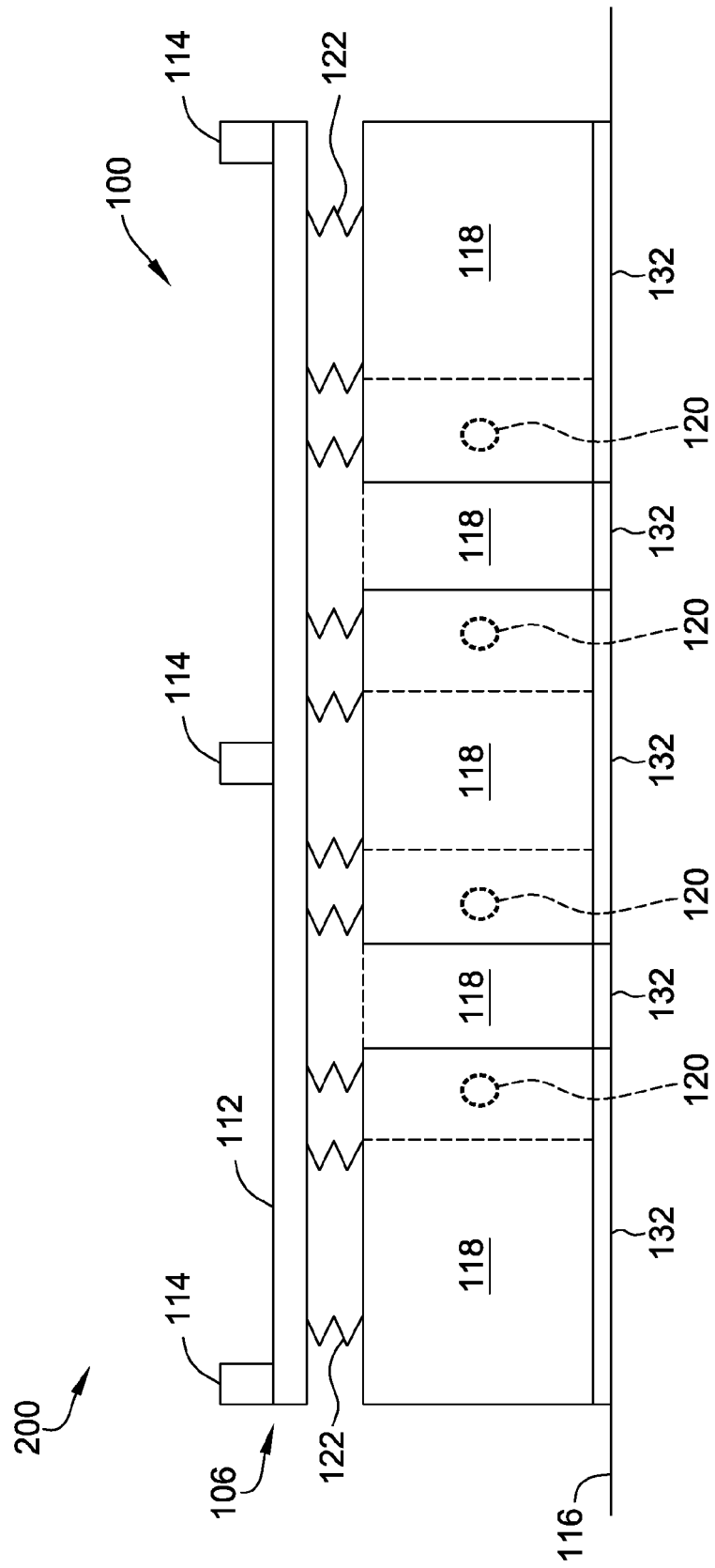
FIG. 2 is a schematic front view of the material application and dispersal device shown in FIG. 1.
Figure 3:
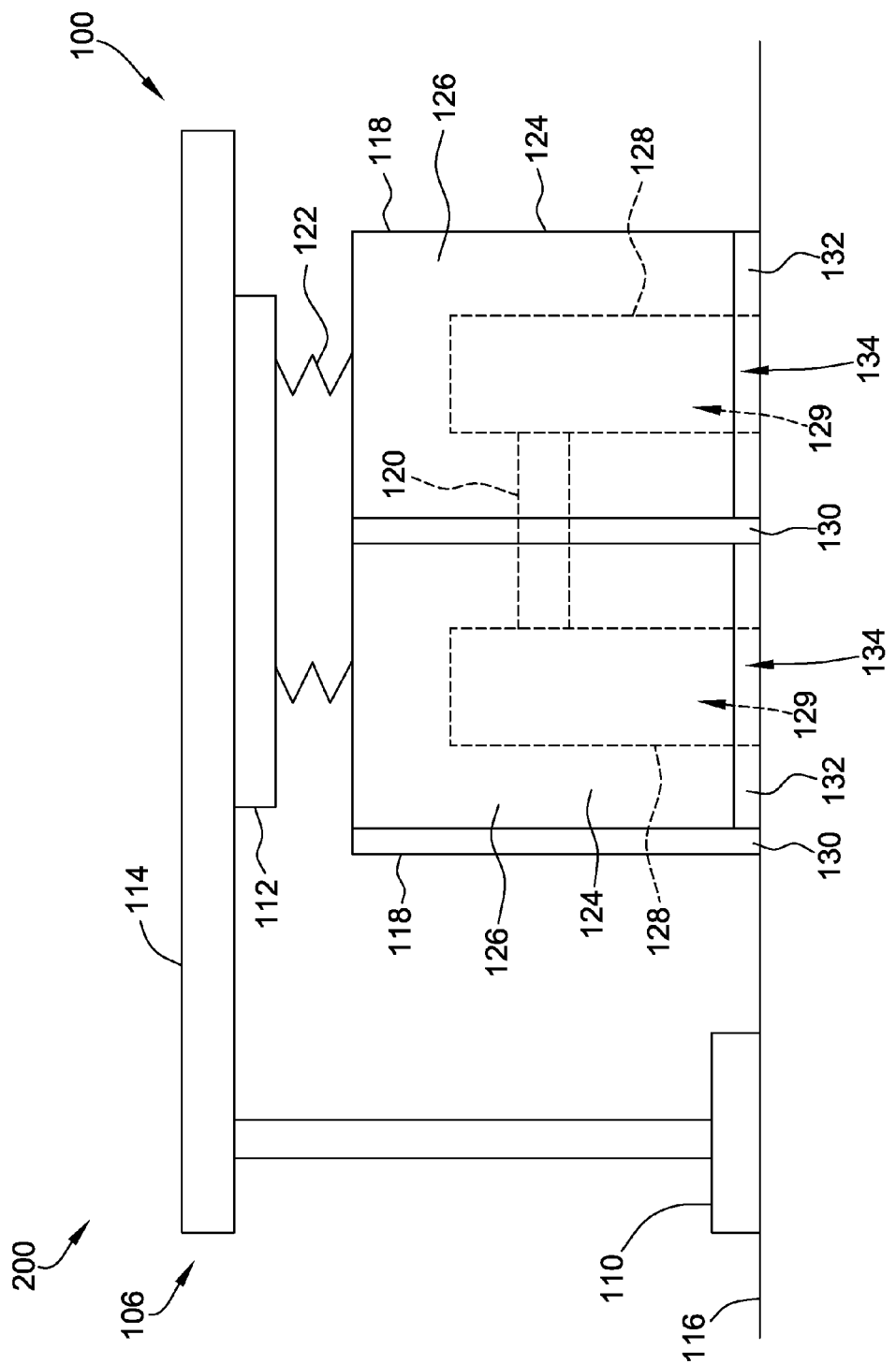
FIG. 3 is a schematic side view of the material application and dispersal device shown in FIG. 1.

FIG. 1 is a schematic view of a material application and dispersal device (MADD) 100 for use in a re-surfacing system 200 in accordance with one embodiment of the disclosure. FIG. 2 is a schematic front view of MADD 100, and FIG. 3 is a schematic side view of MADD 100. System 200 also includes a source 102 of spreadable material and a pressurization device 104 coupled in flow communication with source 102 via a conduit 103 to facilitate channeling the spreadable material between source 102 and MADD 100.

In the exemplary embodiment, MADD 100 includes a frame 106, a material application assembly (MAA) 108 coupled to frame 106, and a depth control device 110 coupled to frame 106. Frame 106 includes at least one first support member 112 and a plurality of second support members 114 coupled to first support member 112. First support member 112 is coupled to MAA 108 and is oriented substantially perpendicular to a direction of travel of MADD 100. More specifically, first support member 112 is adjustably coupled to second support member 114 such that first support member 112 provides a modifiable downward force on MAA 108 to change the contact pressure of MAA 108 on a pavement surface 116. In the exemplary embodiment, MADD 100 includes a single first support member 112 and MAA 108. In other embodiments, MADD 100 includes more than one first support member 112 and MAA 108. Second support members 114 are coupled to a mobile device (not shown) such as a truck, or other mobile device, as it travels along pavement surface 116. Second support members 114 are oriented substantially parallel to the direction of travel and are also coupled to depth control device 110.

In the exemplary embodiment, MADD 100 is configured to apply the spreadable material (e.g., a slurry material, an emulsion oil, a micro-surfacing material, resin, rejuvenator, or other material) uniformly to pavement surface 116 through MAA 108. More specifically, a positive pressure built up within MAA 108 by pressurization device 104 injects the spreadable material into cracks in pavement surface 116. MAA 108 includes a plurality of segmented, independently biased material application mechanisms (MAMs) 118 coupled to first support member 112. Each MAM 118 applies the spreadable material to pavement surface 116. More specifically, MAMs 118 are segmented with sufficient frequency across a width of MADD 100 so they apply sufficient pressure to the spreadable material and allow uniform dispersion of the spreadable material when pavement surface 116 is uneven, e.g., when pavement surface 116 is a roadway with surface wheel-rutting. Although MAA 108 is described herein as including a plurality of MAMs 118, in some embodiments, MAA 108 includes a single MAM 118 that spans a full width of MADD 100.

During operation of system 200 in accordance with the example embodiment, spreadable material is channeled from source 102 to MADD 100 by pressurization device 104 through conduit 103. In the exemplary embodiment, pressurization device 104 is a pump that continuously recirculates the spreadable material between source 102 and MAMs 118 of MADD 100. Alternatively, pressurization device 104 is any device, for example, but not limited to, pneumatic, hydraulic, mechanical, or other biasing mechanisms that facilitate operation of MADD 100 as described herein. As described in further detail below, each MAM 118 at least partially forms a seal with pavement surface 116 and pressurization device 104 generates a positive pressure within each MAM 118 that forces the spreadable material into cracks formed in pavement surface 116 to apply a re-surfacing layer of spreadable material. MAA 108 then smooths the deposited spreadable material over pavement surface 116. Depth control device 110 then passes over the re-surfacing layer of spreadable material to control the depth of the re-surfacing layer. In one embodiment, depth control device 110 is a mechanical device that is dragged over the re-surfacing layer. In another embodiment, depth control device 110 is a pneumatic device that expels air through a fine nozzle (air blade). Furthermore, in yet another embodiment, depth control device 110 also texturizes the re-surfacing layer.

In the exemplary embodiment, MAA 108 includes a plurality of MAMs 118 coupled together such that MAMs 118 form a single linked row that spans the width of MADD 100. Furthermore, a portion of each MAM 118 is offset with respect to an adjacent MAM 118 such that portions of adjacent MAMs 118 overlap. Offsetting each MAM 118 with respect to an adjacent MAM 118 facilitates smoothing any ridge that may form at opposing ends of MAMs 118 and evenly dispersing the spreadable material.

In the exemplary embodiment, MAA 108 includes a plurality of connecting links 120 that pivotally couple adjacent MAMs 118 to one another. Connecting links 120 enable one MAM 118 to pivot with respect to the adjacent MAM 118 to which it is coupled in response to changes in pavement surface 116 contour. As such, each MAM 118 is independently pivotable with respect to adjacent MAMs 118 to facilitate delivering an even re-surfacing layer of spreadable material onto pavement surface 116.

Figure 5:
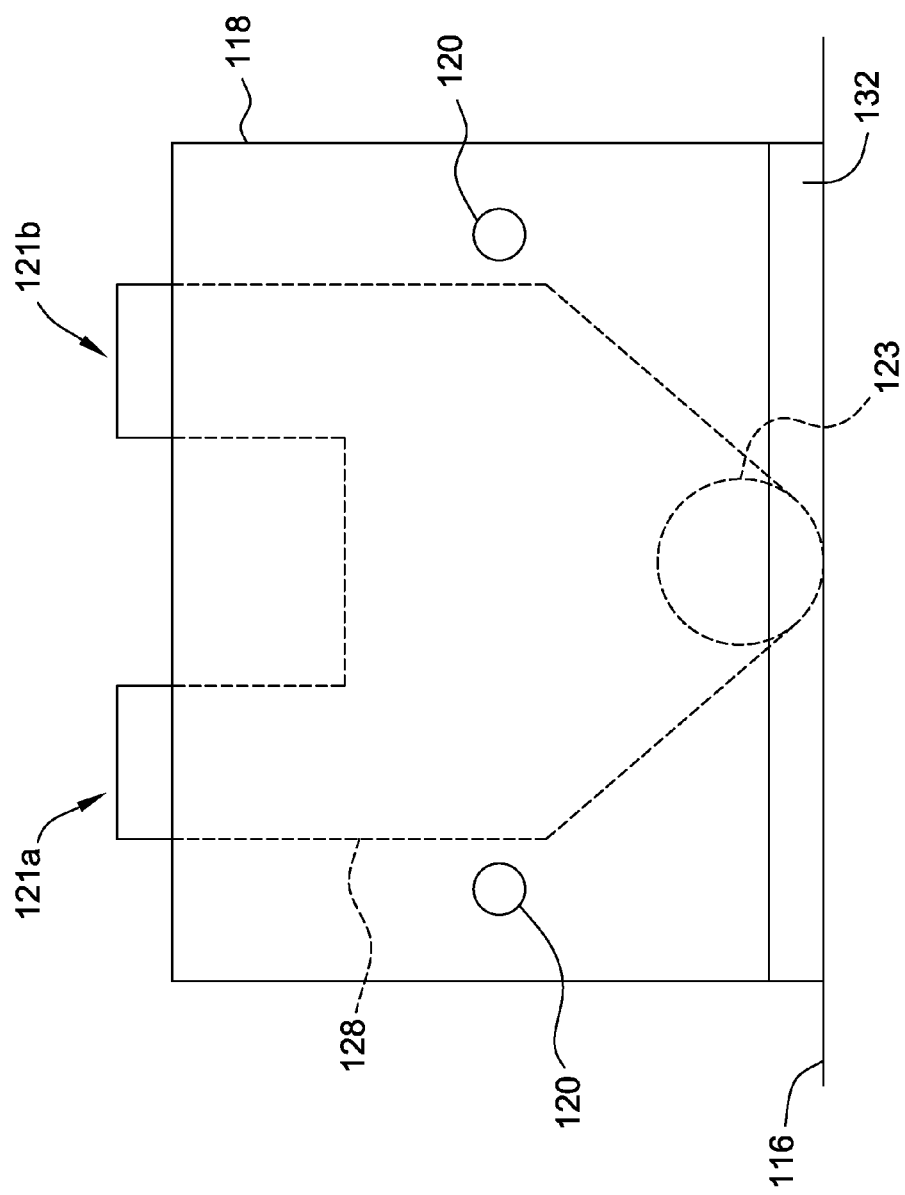
FIG. 5 is a schematic diagram of an alternative material application mechanism that may be used with the material application and dispersal device shown in FIG. 1.

In one embodiment, connecting links 120 also couple adjacent MAMs 118 in fluid communication with each other and facilitate channeling the spreadable material through the plurality of coupled MAMs 118. More specifically, each MAM 118 includes a connecting link inlet 120a for receiving a flow of spreadable material and a connecting link outlet 120b for discharging a portion of the flow of spreadable material from the MAM 118. As such, in the exemplary embodiment, connecting links 120 serve two purposes: 1) to pivotally couple adjacent MAMs 118 such that each MAM 118 maintains continuous contact with pavement surface 116; and 2) to couple adjacent MAMs 118 in flow communication to facilitate channeling the spreadable material therethrough. In an alternative embodiment, as shown in FIG. 5, each MAM 118 includes a pair of connecting links 120 for coupling to adjacent MAMs 118, but each MAM 118 also includes a separate spreadable material inlet 121a and a spreadable material outlet 121b spaced away from connecting links 120. Also shown in FIG. 5 is an optional application device 123 that may be used to apply the spreadable material to pavement surface 116. In one embodiment, application device 123 is a ball valve positioned within MAM 118. The ball gets displaced when MAM 118 is biased downward toward pavement surface 116 and allows the spreadable material to flow from within MAM 118, through the ball valve, and onto pavement surface 116.

In the exemplary embodiment, MAA 108 also includes a plurality of biasing elements 122 coupled between MAA 108 and first support member 112. More specifically, MAA 108 includes at least one biasing element 122 coupled between each MAM 118 and first support member 112. In the exemplary embodiment, biasing elements 122 provide a downward biasing force onto an associated MAM 118 such that MAM 118 maintains a seal with pavement surface 116. Furthermore, biasing elements 122 enable each MAM 118 to move vertically and rotate in order to follow the contour of pavement surface 116.

In the exemplary embodiment, each MAM 118 includes a vessel 124 having a plurality of walls 126 that form a cavity 128 within vessel 124. Walls 126 also define an opening 129 at a bottom of vessel 124 proximate pavement surface 116. Opening 129 is in flow communication with cavity 128 such that the spreadable material can be channeled from cavity 128 through bottom opening 129 to pavement surface 116. In the exemplary embodiment, bottom opening 129 includes a length that extends a majority of a length of MAM 118 and a width within a range of approximately 0.5 inches (in.) to 2.0 in. Alternatively, bottom opening 129 includes any dimensions that facilitate operation of MAM 118 as described herein.

Furthermore, as described herein, a positive pressure is created within each cavity 128, such as by pressurization device 104, which facilitates channeling the spreadable material through adjacent MAMs 118 and applying the spreadable material to pavement surface 116. As such, a portion of the spreadable material that is channeled into each cavity 128 is further channeled to an adjacent MAM 118, through connecting links 120, and a second portion of the spreadable material is applied to pavement surface 116 through bottom opening 129. As described above, in the exemplary embodiment, connecting links 120 serve to channel the spreadable material between adjacent MAMs 118. More specifically, links 120 couple cavities 128 of adjacent MAMs 118 in fluid communication to enable the spreadable material to flow therethrough. In this embodiment, MAMs 118 are linked together in a chain such that MAA 108 includes a single inlet and a single outlet coupled to pressurization device 104 which recirculates the spreadable material between source 102 and MAA 108 without being coupled to each individual MAM 118. Alternatively, each MAM 118 is coupled individually to pressurization device 104 to facilitate channeling the spreadable material to each MAM 118 independently.

Furthermore, each MAM 118 includes a dispersing element 130. In the exemplary embodiment, dispersing element 130 is coupled to a rear wall of the plurality of walls 126 of vessel 124 and evenly disperses the spreadable material after it has been applied to pavement surface 116. In the exemplary embodiment, dispersing element 130 is either a brush or a blade (e.g., a squeegee). Alternatively, dispersing element 130 is any other means of evenly dispersing the spreadable material on pavement surface 116. The type of dispersing element 130 is determined by the desired application characteristics. For example, a brush may be desirable when applying an emulsion oil to pavement surface 116 to facilitate urging the emulsion oil into voids, or cracks, in the pavement surface. Alternatively, a blade may be desirable when applying a spreadable material to the pavement surface 116 to facilitate application of a smooth and even layer of the spreadable material due to its more rigid construction when compared to a brush.

In the exemplary embodiment, each MAM 118 also includes a sealing element 132 coupled to vessel 124 proximate pavement surface 116. Sealing elements 132 are biased downward by at least one of first supporting member 112 and biasing elements 122 to contact pavement surface 116. As such, sealing elements 132 at least partially form a seal between MAM 118 and pavement surface 116 such that the positive pressure within cavity 128 of MAM 118 is generated. More specifically, a combination of sealing elements 132, biasing elements 122, walls 126, and pressurization device 104 completely enclose cavity 128 to create a positive pressure differential between cavity opening 129 and the ambient atmosphere. As used herein, the term "positive pressure" is used to describe a pressure level within cavity 128 of MAM 118 that is greater than the nominal head pressure caused by the weight of the spreadable material pushing down on itself in an open container exposed to ambient conditions. That is, the enclosed cavity 128 formed by walls 126, sealing element 132, and pavement surface 116 enables pressurization device 104 to increase the pressure within cavity 128 to a level greater than would be attainable if cavity 128 were not enclosed. More specifically, in the exemplary embodiment, the pressure within cavity 128 during operation is within a range of 1 pound per square inch (psi) to 15 psi. In another embodiment, the pressure within cavity 128 during operation is within a range of 1 psi to 5 psi. In yet another embodiment, the pressure within cavity 128 during operation is within a range of 6 psi to 10 psi.

This pressure differential creates the positive pressure within cavities 128 that facilitate injecting the spreadable material into cracks in pavement surface 116. Generating positive pressure within MAMs 118 enables the use of a more viscous spreadable material that, under non-positively pressurized conditions, would not flow through conduit 103 and MAMs 118 and into a crack in pavement surface 116. The use of a more viscous material is advantageous because once the spreadable material is injected into the crack, it is more likely to remain in the crack and fill the void to create a smooth surface 116.

Sealing elements 132 are formed from a resilient material, for example but not limited to rubber, plastic, and natural or synthetic fibers, such that sealing elements 132 may change shape follow the contour of pavement surface 116 to maintain continuous contact with pavement surface 116. In the exemplary embodiment, sealing elements 132 include any combination of a unitary component, a plurality of strips, and a plurality of bristles. Alternatively, sealing elements 132 are formed from any material in any configuration that facilitates operation of MADD 100 as described herein. Furthermore, each sealing element 132 includes a bottom opening 134 in flow communication with cavity 128 such that the spreadable material can be channeled from cavity 128 through bottom opening 129 and through bottom opening 134 to pavement surface 116.

Figure 4:
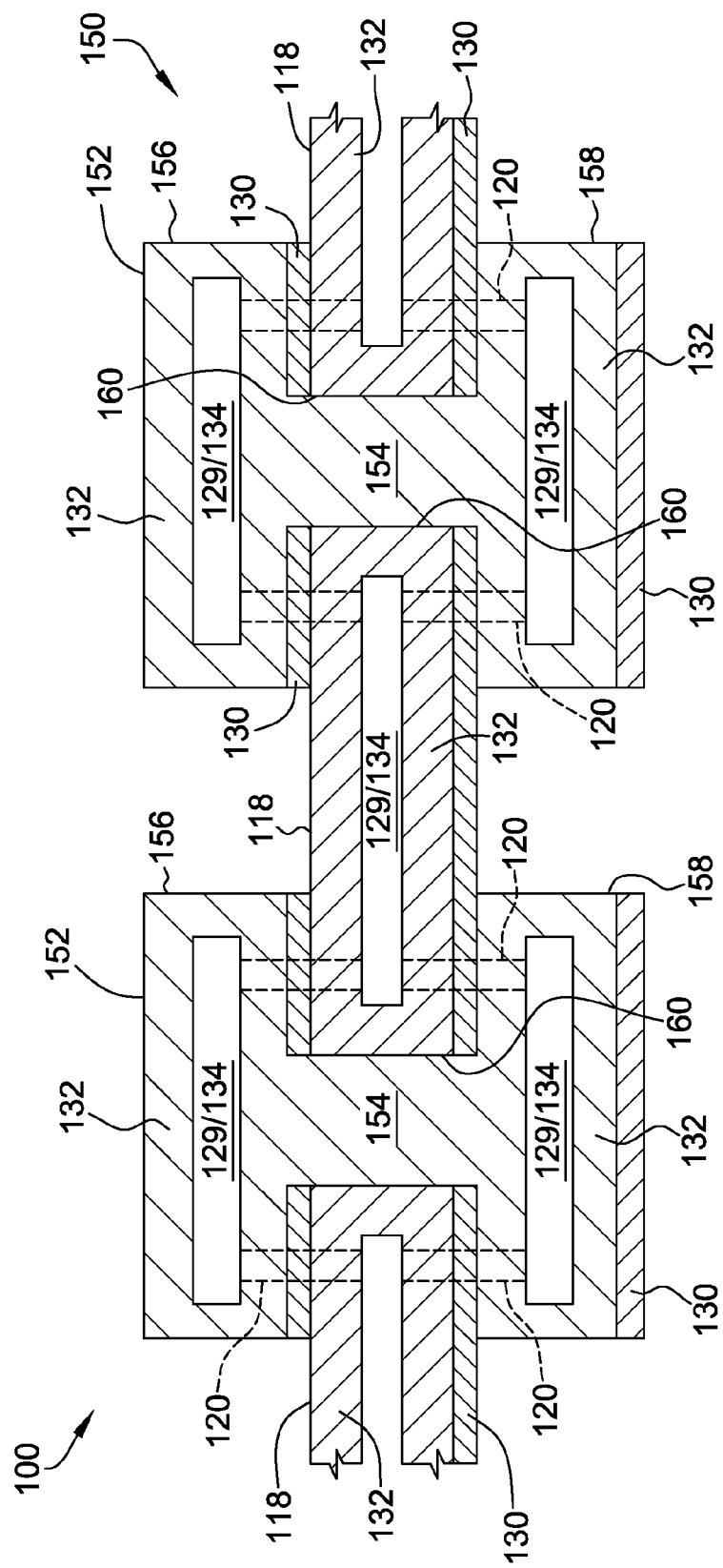
FIG. 4 is a schematic bottom view of an alternative material application and dispersal device that may be used in the re-surfacing system.

FIG. 4 is a schematic diagram of an alternative material application assembly (MAA) 150 that may be used with MADD 100 shown in FIG. 1. MAA 150 includes a first plurality of MAMs 118, as described above, and a second plurality of MAMs 152 alternatingly-spaced with MAMs 118. In one embodiment, MAMs 152 include two MAMs 118 coupled together with a neck portion 154. More specifically, each MAM 152 includes a first MAM 156 and a second MAM 158 spaced by neck portion 154. MAMs 156 and 158 and neck portion 154 form an I shape that defines a pair of opposing notches 160 that receive a MAM 118 therein.

In this embodiment, at least a portion of MAM 118 overlaps with each of MAM 156 and 158 and is coupled each of MAM 156 and 158 by connecting links 120, similar to links 120 as in MAA 108. As with MAA 108, there is only a minimal gap, if any, between MAM 118 and MAMs 156 and 158 in MAA 150. Accordingly, MAA 150 forms a single row of MAMs 118, 156, and 158 that are offset to at least partially overlap each other to smooth out any seams that form in the spreadable material at the edges of MAMs 118, 156, and 158. Additionally, overlapping MAMs 118, 156, and 158 mitigates or eliminates trapping air within cracks on pavement surface 116 that are perpendicular to the direction of travel. Furthermore, overlapping MAMs 118, 156, and 158 along the direction of travel causes multiple pulses or injections of spreadable material in to a single crack in pavement surface 116 as MADD 100 passes over the crack.

In one embodiment, each MAM 118 and 152 delivers and disperses the same spreadable material. In another embodiment, MAMs 118 and 152 deliver and disperse different spreadable materials. In yet another embodiment, MAM 118 delivers and disperses the same spreadable material as one of MAMs 156 or 158, but a different material that the remaining one of MAM 156 or 158.

As described, MADD 100 uniformly applies spreadable material to a pavement surface 116. MAMs 118 of MAA 108, or MAMs 118, 156, and 158 of MAA 150, are configured to move vertically and rotate so that each MAM 118, 156, and 158 follows the contour of the pavement surface 116. Additionally, first and second support members 112 and 114 of MADD 100 are adjustably coupled to frame 106 such that the contact pressure of each MAM 118, 156, and 158 can be changed to maintain the seal between MAMs 118, 156, and 158 and surface 116. Therefore, MADD 100 is configurable to apply even contact pressure along the contour of the pavement surface 116 to effect uniform application of spreadable material to the pavement surface 116.

Figure 6:
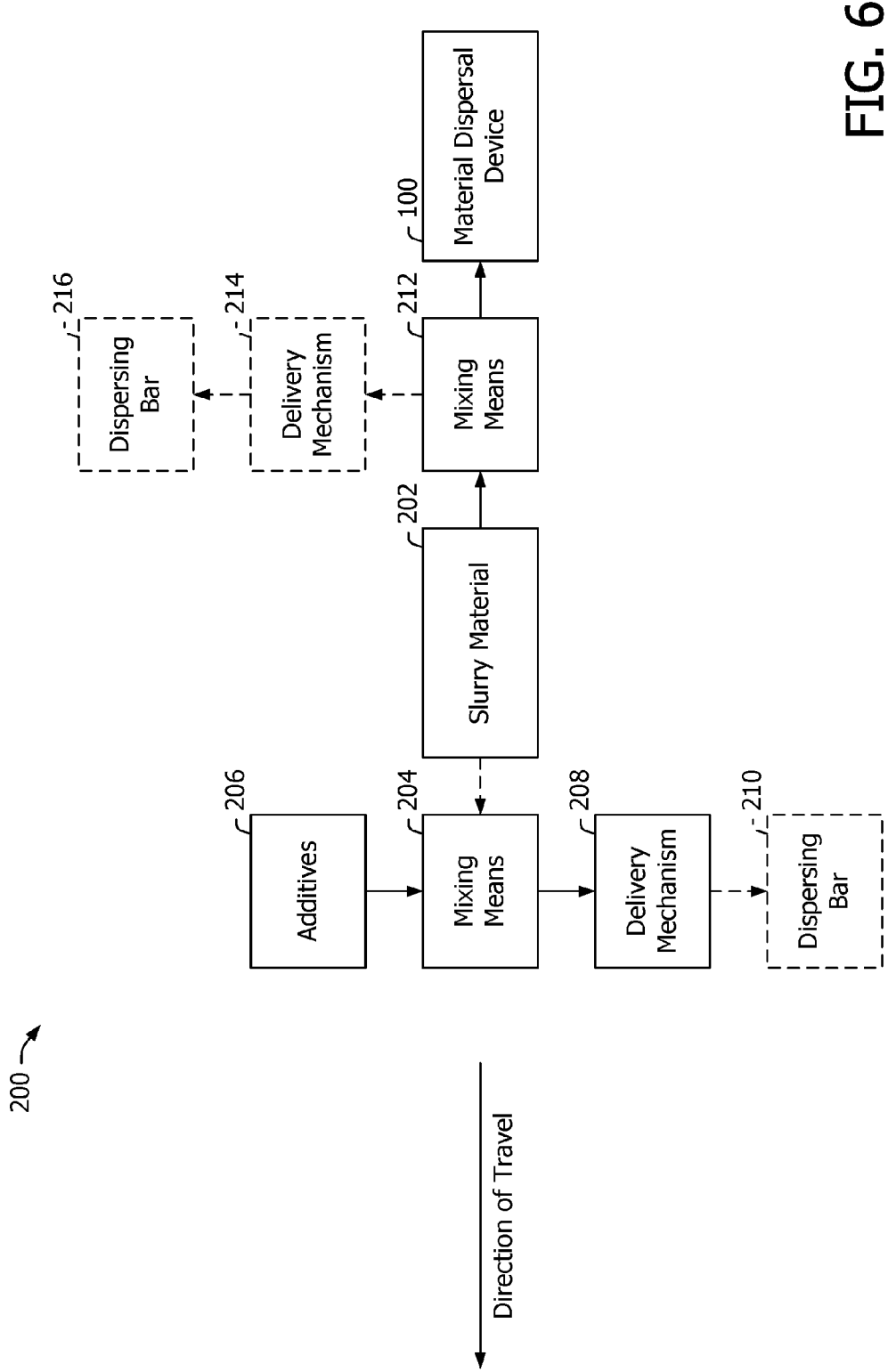
FIG. 6 is block diagram of an exemplary system for re-surfacing a pavement surface including the material dispersal device shown in FIG. 1.

FIG. 6 is a block diagram of an exemplary system 200 for re-surfacing a pavement surface including a material dispersal device 100 (shown in FIG. 1). System 200 may be implemented using any mobile device configurable for re-surfacing applications. For example, the mobile device may be a truck equipped with material storage facilities, pumps, plumbing, towing means, and other equipment which allow the mobile device to store, transport, disperse, and distribute material to micro-surface a pavement surface. During operation, material is applied as the mobile device moves across the pavement surface thereby re-surfacing the pavement surface.

To re-surface a pavement surface, a slurry material 202 is stored in a mobile device (not shown), e.g., in bulk tank storage of the mobile device. Slurry material 202 includes emulsified oil and aggregate, such as but not limited to a chip seal or asphaltic concrete (hot mix asphalt). Slurry material 202 may further include one or more of emulsified asphalt, water, catalysts (e.g., Portland cement), chemicals to slow system break, fiber material, and other materials. In one embodiment, slurry material 202 is a micro-surfacing material used to micro-surface a roadway. In another embodiment, slurry material 202 is a seal coat. In yet another embodiment, slurry material 202 is an emulsion oil and is used to facilitate a crack sealing process. Slurry material 202 may be pre-mixed off site, compounded on the mobile device, or a combination of both.

At least some of slurry material 202 may be mixed 204 with additives 206 to improve ductility, adhesion, crack sealing, toughness, or other similar properties. Mixing 204 may be accomplished using any standard means, e.g., using line injection. The resulting mixture may be distributed on the paved surface using a delivery mechanism 208 (e.g., a spray bar). Delivery mechanism 208 includes one or more apertures or slits, and is configured to controllably apply material to the pavement surface. Delivery mechanism 208 may further be configured to produce a gravity flow or a pressurized flow. In some embodiments, delivery mechanism 208 is a component of the mobile device (or is coupled with the mobile device). In one embodiment, delivery mechanism 202 is a component of MADD 100 and includes a MAA 108 having at least one MAM 118. In the example embodiment, delivery mechanism 208 facilitates application of the spreadable material to the pavement surface in a layer with substantially uniform thickness.

When pre-mixed off site and/or compounded on the mobile device, spreadable material 202 is blended by the pump action of delivery mechanism 208. Once blended, spreadable material 202 will begin to destabilize (or break) and eventually cure. The components of spreadable material 202 affect how quickly material 202 will cure after destabilization begins. In one embodiment, delivery mechanism 208 agitates slurry material 202 (e.g., by the pumping action) to slow destabilization while spreadable material 202 is transported to the point of application.

In one embodiment, system 200 includes a dispersing bar 210 configured to disperse the spreadable material mixture on the pavement surface. In the exemplary embodiment, dispersing bar 210 is either a brush or a blade (e.g., a squeegee) system similar to dispersing element 130. Alternatively, dispersing bar 210 is any other means of evenly dispersing the spreadable material on pavement surface 116. In some embodiments, dispersing bar 210 is a component of the mobile device (or is coupled with the mobile device). In other embodiments, dispersing bar 210 is a component of MADD 100, such as dispersing elements 130, (or is coupled with material dispersal device 100). In an alternative embodiment, system 200 includes a thermal bias (not shown) located proximate dispersing bar 210. The thermal bias is used to induce heat to the slurry material mixture, e.g., to reduce the viscosity of the mixture such that it may be more easily urged into voids or cracks in the pavement surface.

In another aspect of system 200, spreadable material 202 is mixed 212 then introduced into MADD 100 to re-surface the pavement surface. In the example embodiment, the mobile device includes a pugmill, a pump and spray system, or other device for mixing 212 spreadable material 202. The mobile device further includes standard equipment to transport slurry material 202 to MADD 100. Spreadable material 202, once mixed 212, is applied to the pavement surface by MADD 100. As previously described, MADD 100 is configured to uniformly apply spreadable material 202 to the pavement surface.

In one embodiment, some or all of spreadable material 202 is distributed and dispersed on the pavement surface using a delivery mechanism 214 and a dispersing bar 216. Delivery mechanism 214 is configured to controllably apply spreadable material 202 to the pavement surface and dispersing bar 216 is a brush or blade system configured to disperse spreadable material 202 on the pavement surface in a layer having substantially uniform thickness.

In another embodiment, spreadable material 202 includes a first slurry material, a fiber material, and a second slurry material. During operation, the first slurry material is mixed 204 and applied to the pavement surface, the fiber material is applied to the pavement surface, and the second spreadable material is mixed 212 and applied to the pavement surface. In some embodiments, the fiber material is a single fiber material. In other embodiments, the fiber material is a composition including one or more different fiber materials, where each of the different fiber materials has unique size, shape, strength, texture, or other characteristics. For example, a first slurry material is applied to the pavement surface by a first delivery mechanism, a fiber material is applied to the pavement surface by a second delivery mechanism, and a second slurry material is applied to the pavement surface by a third delivery mechanism. In some embodiments, a re-surfaced pavement is created by passing a material dispersal device over the first slurry material, the fiber material, and the second slurry material. In other embodiments, a re-surfaced pavement is created by passing a dispersing bar over the materials, where the dispersing bar is configured to apply substantially uniform pressure across the pavement surface.

In yet another embodiment, spreadable material 202 includes a first slurry material and a second slurry material, where the first slurry material and the second slurry material are different. During operation, the first slurry material is mixed 204 and applied to the pavement surface and the second slurry material is mixed 212 and introduced into MADD 100 (or applied to the pavement surface). For example, a first slurry material is applied to the pavement surface by a first MADD 100 and a second slurry material is applied to the pavement surface by a second MADD 100. In some embodiments, the first slurry material is dispersed on the pavement surface by a dispersing bar to facilitate crack filling (or crack sealing) by urging the first slurry material into cracks (or voids) in the pavement surface. In other embodiments, a re-surfaced pavement is created by passing a material dispersal device over the first slurry material and the second slurry material. In yet other embodiments, a re-surfaced pavement is created by passing a dispersing bar over the slurry materials, where the dispersing bar is configured to apply substantially uniform pressure across the pavement surface. In the previous example, the material dispersal device may or may not include an auger.

FIGS. 7 through 10 illustrate exemplary systems having some or all of the elements of system 200 shown in FIG. 2. These systems represent alternative embodiments of system 200 shown in FIG. 2 for re-surfacing a pavement surface. These systems may be implemented using any mobile device suited for re-surfacing applications. For example, the mobile device may be a truck equipped with material storage facilities, pumps, plumbing, towing means, and other equipment which allow the mobile device to store, transport, disperse, and distribute material to micro-surface a pavement surface. During operation, slurry material is applied as the mobile device moves across the pavement surface thereby re-surfacing the pavement surface.

Figure 7:
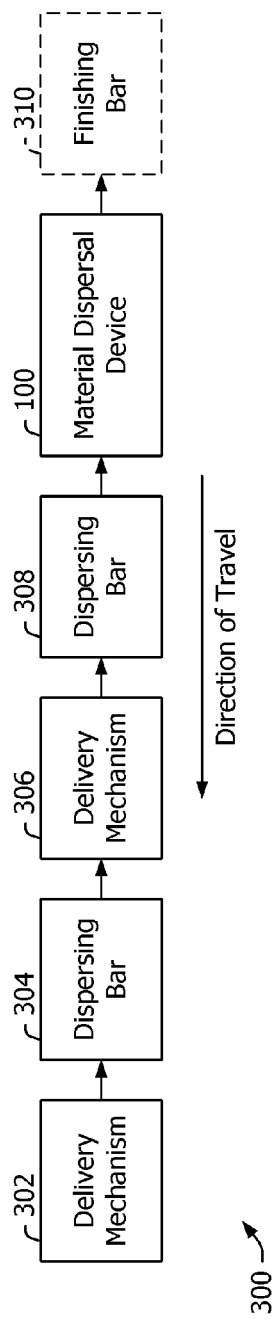
FIG. 7 is a block diagram of an exemplary system for re-surfacing a pavement surface similar to the system shown in FIG. 6.

FIG. 7 is a block diagram of an alternative system 300 for re-surfacing a pavement surface similar to system 200 shown in FIG. 6. System 300 includes a delivery mechanism 302, a dispersing bar 304, a MADD 100, an additional delivery mechanism 306, an additional dispersing bar 308, and optionally includes a finishing bar 310. In one embodiment, delivery mechanisms 302 and 306 are components of MADD 100 and each include a MAA 108 having at least one MAM 118. Slurry material is applied to the pavement surface by MADD 100. Delivery mechanism 302 applies a primer coating, a slurry, and/or other material to the pavement surface which is dispersed by dispersing bar 304. Additional material may be applied and dispersed by delivery mechanism 306 and dispersing bar 308. Slurry material is then applied to the pavement surface by MADD 100. Finishing bar 310 is used to texture, or otherwise finish, the re-surfaced pavement. As described above, MADD 100 includes both delivery and dispersal mechanisms (MAMs 118 with dispersing elements 130) and, as such, can be used to deliver and disperse a single material and additional MADDs 100 can be used to deliver and disperse additional materials.

Figure 8:
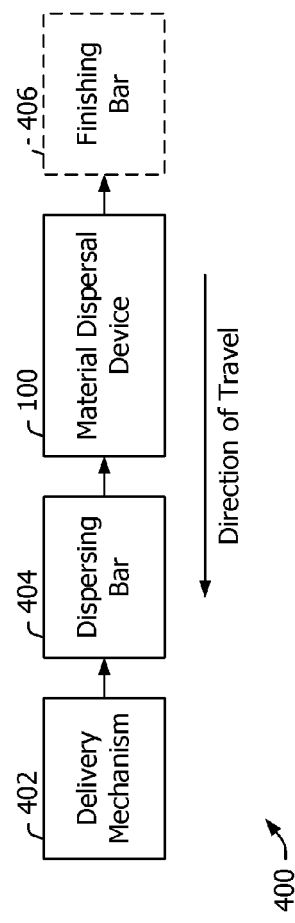
FIG. 8 is a block diagram of another exemplary system for re-surfacing a pavement surface similar to the system shown in FIG. 6.

FIG. 8 is a block diagram of another alternative system 400 for re-surfacing a pavement surface similar to system 200 shown in FIG. 6. System 400 includes a delivery mechanism 402, a dispersing bar 404, a MADD 100, and optionally includes a finishing bar 406. In one embodiment, delivery mechanism 402 is a component of MADD 100 and includes MAA 108 having at least one MAM 118. Slurry material is applied to the pavement surface by MADD 100. Delivery mechanism 402 applies a primer coating, slurry material, and/or other material to the pavement surface which is dispersed by dispersing bar 404. Slurry material is then applied to the pavement surface by MADD 100. Finishing bar 406 is used to texture, or otherwise finish, the re-surfaced pavement. As described above, MADD 100 includes both delivery and dispersal mechanisms (MAMs 118 with dispersing elements 130) and, as such, can be used to deliver and disperse a single material and additional MADDs 100 can be used to deliver and disperse additional materials.

Figure 9:
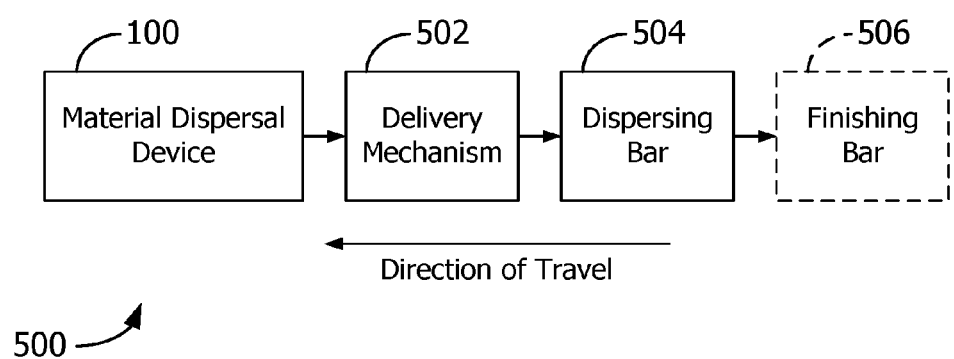
FIG. 9 is a block diagram of a further exemplary system for re-surfacing a pavement surface similar to the system shown in FIG. 6.

FIG. 9 is a block diagram of a further alternative system 500 for re-surfacing a pavement surface similar to system 200 shown in FIG. 6. System 500 includes a MADD 100, a delivery mechanism 502, a dispersing bar 504, and optionally includes a finishing bar 506. In one embodiment, delivery mechanism 502 is a component of MADD 100 and includes MAA 108 having at least one MAM 118. Slurry material is applied to the pavement surface by MADD 100. Additional material may be applied to the pavement surface by delivery mechanism 502 and dispersed by dispersing bar 504. Finishing bar 506 is used to texture, or otherwise finish, the re-surfaced pavement. As described above, MADD 100 includes both delivery and dispersal mechanisms (MAMs 118 with dispersing elements 130) and, as such, can be used to deliver and disperse a single material and additional MADDs 100 can be used to deliver and disperse additional materials.

Figure 10:
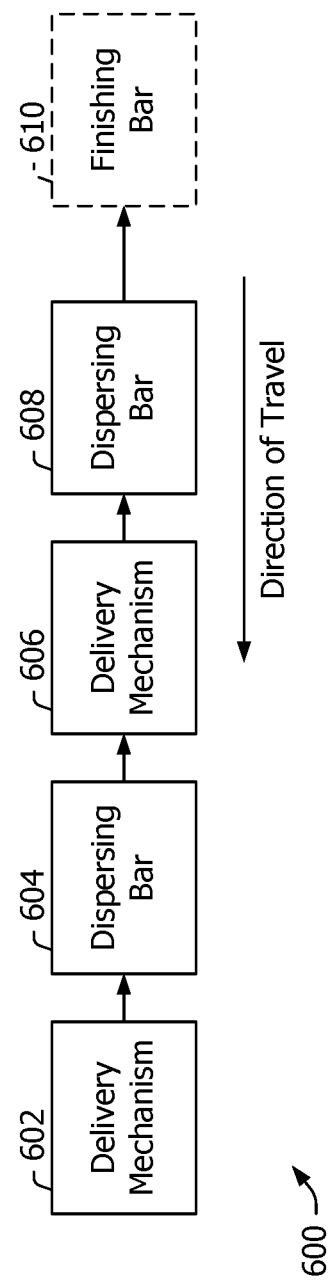
FIG. 10 is a block diagram of a further exemplary system for re-surfacing a pavement surface similar to the system shown in FIG. 6.

FIG. 10 is a block diagram of an alternative system 600 for re-surfacing a pavement surface similar to system 200 shown in FIG. 6. System 600 includes MADD 100 including a first delivery mechanism 602, a first dispersing bar 604, a second delivery mechanism 606, a second dispersing bar 608, and optionally includes a finishing bar 610. In one embodiment, delivery mechanisms 602 and 606 are components of MADD 100 and each include a MAA 108 having at least one MAM 118. First delivery mechanism 602 applies a first spreadable material chosen from a slurry, a microsurfacing material, an emulsion oil, a rejuvenating oil, or any combination thereof to the pavement surface which is then dispersed by first dispersing bar 604. Second delivery mechanism 606 applies a second spreadable material chosen from a slurry, a microsurfacing material, an emulsion oil, a rejuvenating oil, a hot mix asphalt, a cold mix asphalt, or a chip seal surface. Second dispersing bar 608 then disperses the second spreadable material on the pavement surface. Finishing bar 610 is optionally used to texture, or otherwise finish, the re-surfaced pavement.

In the exemplary embodiment, as described above, first and second delivery mechanisms 602 and 606 along with first and second dispersing bars 604 and 608 are components of MADD 100 such that second delivery mechanisms 602 and 606 along with first and second dispersing bars 604 and 608 are all dragged behind a single mobile device, such as a truck. As such, the first and second spreadable materials are applied to and dispersed on the pavement surface in a single pass of the mobile device over the pavement surface. More specifically, the first spreadable material is dispersed by first dispersing bar 604 within a range of approximately less than one second and approximately two minutes from the time the first spreadable material is applied to the pavement surface. Even more specifically, the first spreadable material is dispersed by first dispersing bar 604 within a range of approximately less than one second and approximately one minute, within a range of approximately less than one second and approximately thirty seconds, within a range of approximately less than one second and approximately twenty seconds, within a range of approximately less than one second and approximately ten seconds, and within a range of approximately less than one second and approximately five seconds from the time the first spreadable material is applied to the pavement surface.

Similarly, the second spreadable material is applied to the pavement surface by the second delivery mechanism 606 within a range of approximately less than one second and approximately two minutes from the time the first spreadable material is dispersed by first dispersing bar 604 on the pavement surface. More specifically, the second spreadable material is applied by second delivery mechanism 606 within a range of approximately less than one second and approximately two minutes from the time the first spreadable material is dispersed on the pavement surface. Even more specifically, the second spreadable material is applied by second delivery mechanism 606 within a range of approximately less than one second and approximately one minute, within a range of approximately less than one second and approximately thirty seconds, within a range of approximately less than one second and approximately twenty seconds, within a range of approximately less than one second and approximately ten seconds, and within a range of approximately less than one second and approximately five seconds from the time the first spreadable material is dispersed onto the pavement surface.

Figure 11:
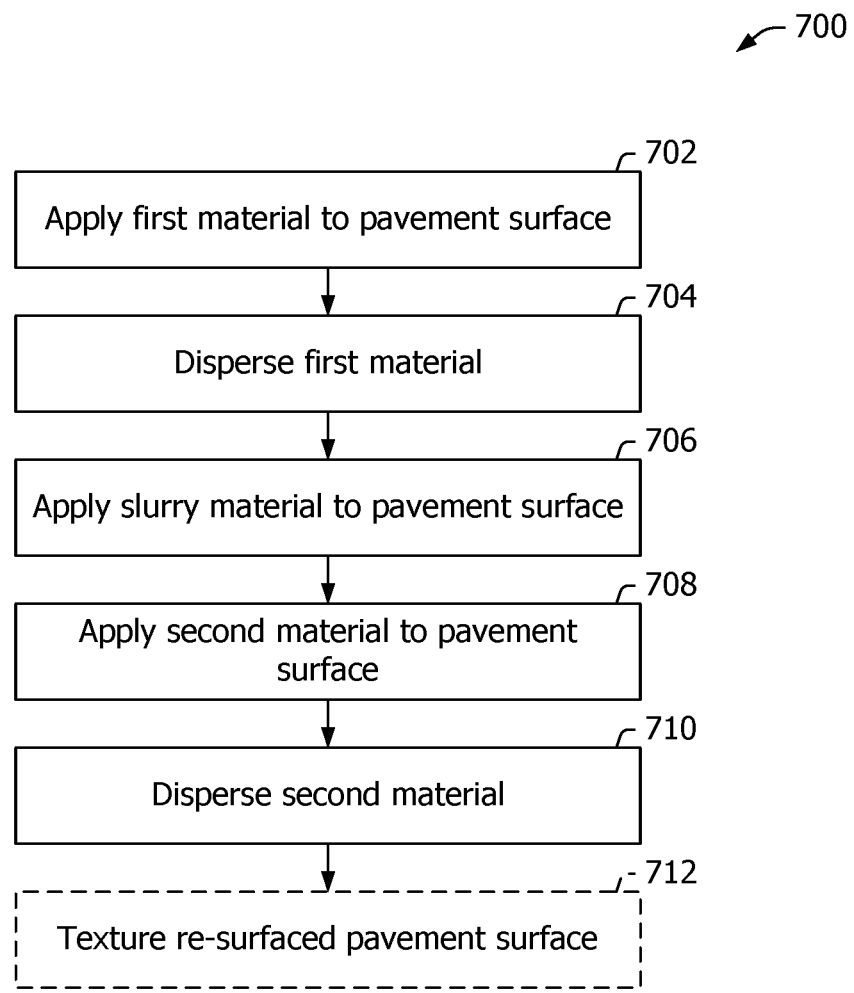
FIG. 11 is a flow diagram of an exemplary method for re-surfacing a pavement surface.

FIG. 11 is a flow diagram of an exemplary method 700 for re-surfacing a pavement surface. In the exemplary embodiment, method 700 is implemented by a re-surfacing system including a material dispersal device, such as system 200 shown in FIG. 2.

During operation, a first material is applied 702 to the pavement surface. The first material may be a primer coating, and/or other re-surfacing material such as an emulsion oil, slurry material, or aggregate. The first material is dispersed 704 on the pavement surface. In some embodiments, dispersing 704 the first material on the pavement surface facilitates a crack filling (or crack sealing) process by urging the first material into voids, or cracks, in the pavement surface using MADD 100. In other embodiments, dispersing 704 facilitates uniform spreading of the first material to allow a layering effect with subsequently applied materials.

Slurry material is applied 706 to the pavement surface using a material dispersal device, such as MADD 100 shown in FIG. 1. The material dispersal device is configured to follow the contour of the pavement surface and apply 706 a uniform layer of material. The slurry material includes emulsified oil and aggregate. The slurry material may also include one or more of emulsified asphalt, water, catalysts (e.g., Portland cement), chemicals to slow system break, fiber material, and other materials. In some embodiments, the slurry material is an emulsion oil and is used to facilitate a crack sealing process.

A second material is applied 708 and dispersed 710 on the pavement surface. The second material may be an emulsion oil, slurry material, or aggregate, such as but not limited to a chip seal or asphaltic concrete (hot mix asphalt). In some embodiments, the second material is used to coat or seal the re-surfaced pavement, or to achieve desired coloring of the re-surfaced pavement. Optionally, the re-surfaced pavement is textured 712 to achieve a surface texture of the re-surfaced pavement. For example, texturing may achieve a surface texture that provides an enhanced driving surface when the re-surfaced pavement is a roadway.

Figure 12:
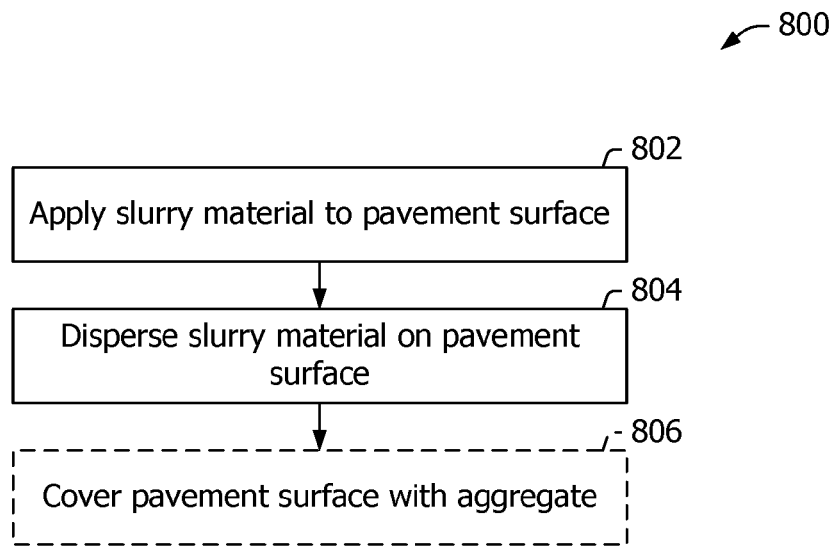
FIG. 12 is a flow diagram of another exemplary method for re-surfacing a pavement surface.

FIG. 12 is a flow diagram of another exemplary method for re-surfacing a pavement surface. Method 800 may be implemented by any suitable re-surfacing system and may optionally be implemented by a system including a material dispersal device, such as system 200 shown in FIG. 2.

During operation, a slurry material is applied 802 to the pavement surface. The slurry material may be applied 802 using MADD 100 or other means, such as an auger, or a spray bar. Depending on the application or desired characteristics of the final re-surfaced pavement, the applied material may be a primer coating, a micro-surfacing material, or an emulsion oil.

The applied slurry material is then dispersed 804 on the pavement surface by MADD 100. Dispersing 804 the slurry material on the pavement surface facilitates crack filling (or crack sealing) by urging the material into voids, or cracks, in the pavement surface. Dispersing 804 the slurry material on the pavement surface also facilitates uniform spreading of the material to allow a layering effect with subsequently applied materials. In one embodiment, the slurry material is dispersed 804 using a dispersing bar, such as dispersing element 130 shown in FIG. 1. The dispersing bar is a brush, a blade, or other suitable device, and is configured to apply substantially uniform pressure across the pavement surface. In other embodiments, the slurry material may be dispersed 804 using a material dispersal device, such as device 100 shown in FIG. 1.

In one embodiment, the pavement surface is covered 806 by an aggregate, such as but not limited to a chip seal or asphaltic concrete (hot mix asphalt). The aggregate at least partially combines with material applied to the pavement surface. For example, the aggregate may at least partially settle, draw, or be urged into the applied slurry material on the pavement surface. The aggregate used to cover 806 the pavement surface is chosen based on the application or desired characteristics of the final re-surfaced pavement. In some embodiments, the aggregate is a single aggregate. In other embodiments, the aggregate is a composition including one or more different aggregates, where each of the different aggregates has a unique size, shape, texture, or other characteristics.

Figure 13:
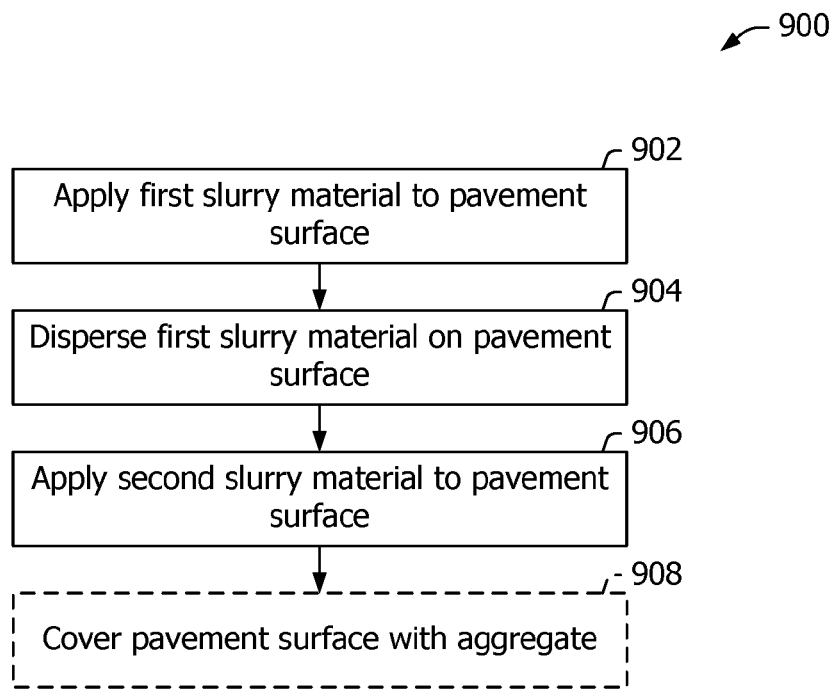
FIG. 13 is a flow diagram of a further exemplary method for re-surfacing a pavement surface similar to the method of FIG. 12.

FIG. 13 is a flow diagram of a further exemplary method 900 for re-surfacing a pavement surface, similar to method 700 shown in FIG. 7. Method 900 may be implemented by any suitable re-surfacing system and may optionally be implemented by a system including a material dispersal device, such as system 200 shown in FIG. 2.

During operation, a first slurry material is applied 902 to the pavement surface. The first slurry material is applied 902 using an auger, plumbing, or other means. Depending on the application or desired characteristics of the final re-surfaced pavement, the first slurry material may be a primer coating, a micro-surfacing material, or an emulsion oil.

The first slurry material is dispersed 904 on the pavement surface to facilitate crack filling (or crack sealing) by urging the material into voids, or cracks, in the pavement surface. Dispersing 904 the first slurry material on the pavement surface also facilitates uniform spreading of the first slurry material to allow a layering effect with subsequently applied materials. In one embodiment, the first slurry material is dispersed 904 by a brush, a blade, or other suitable device. In other embodiments, the first slurry material is dispersed 904 using a material dispersal device such as MADD 100 shown in FIG. 1.

A second slurry material is applied 906 to the pavement surface using an auger, plumbing, or other means. In one embodiment, the second slurry material includes emulsified oil and aggregate. The second slurry material may also include one or more of emulsified asphalt, water, catalysts (e.g., Portland cement), chemicals to slow system break, fiber material, and other materials. In some embodiments, the second slurry material is an emulsion oil and is used to facilitate a crack sealing process. In some embodiments, the first slurry material and the second slurry material are different materials. In other embodiments, the first slurry material and the second slurry material are the same material. In one embodiment, the second slurry material is applied 906 then dispersed on the pavement surface by a brush, a blade, or other suitable device.

The first slurry material, second slurry material, and pavement surface may be covered 908 by an aggregate, such as but not limited to a chip seal or asphaltic concrete (hot mix asphalt). In one embodiment, the aggregate at least partially combines with material applied to the pavement surface. For example, the aggregate may at least partially settle, draw, or be urged into the first slurry material, the second slurry material, or both the first and second slurry materials on the pavement surface. The aggregate used to cover 908 the materials and pavement surface is chosen according to the application or desired characteristics of the final re-surfaced pavement. In some embodiments, the aggregate is a single aggregate. In other embodiments, the aggregate is a composition including one or more different aggregates, where each of the different aggregates has unique size, shape, texture, or other characteristics.

Figure 14:
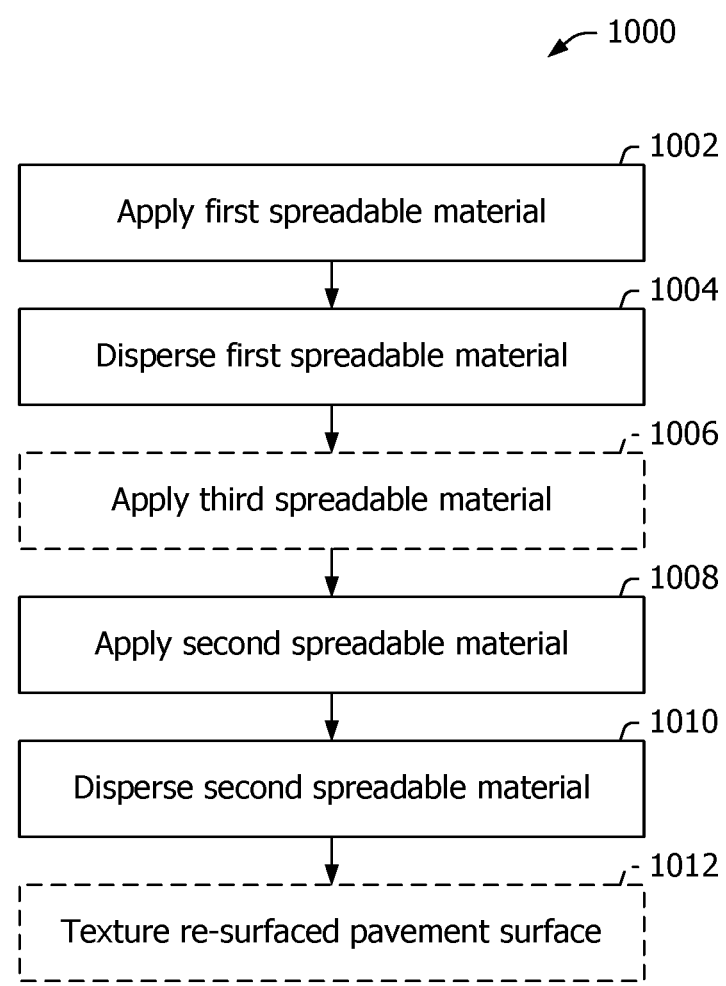
FIG. 14 is a flow diagram of yet another exemplary method for re-surfacing a pavement surface similar to the method of FIG. 12.

FIG. 14 is a flow diagram of an exemplary method 1000 for re-surfacing a pavement surface. In the exemplary embodiment, method 1000 is implemented by a pavement re-surfacing device, such as MADD 100.

During operation, a first spreadable material is applied 1002 to the pavement surface using a first delivery mechanism of the pavement re-surfacing device, or MADD 100. The first spreadable material is chosen from a slurry, a microsurfacing material, an emulsion oil, a rejuvenating oil, or any combination thereof. The first spreadable material is then dispersed 1004 on the pavement surface using a first dispersing bar of the pavement resurfacing device. In some embodiments, dispersing 1004 the first spreadable material on the pavement surface facilitates a crack filling (or crack sealing) process by urging the first spreadable material into voids, or cracks, in the pavement surface using a first dispersing bar of MADD 100. In other embodiments, dispersing 1004 facilitates uniform spreading of the first material to allow a layering effect with subsequently applied materials.

Because the first delivery mechanism and the first dispersing bar are both are components of the pavement re-surfacing device (MADD 100), the first delivery mechanism and the first dispersing bar are both dragged behind a single mobile device, such as a truck, as a component of MADD 100. As such, the first spreadable material is applied 1002 and dispersed 1004 on the pavement surface in a single pass of the mobile device over the pavement surface. More specifically, the first spreadable material is dispersed 1004 by the first dispersing bar within a range of approximately less than one second and approximately two minutes from the time the first spreadable material is applied 1002 to the pavement surface. Even more specifically, the first spreadable material is dispersed 1004 by the first dispersing bar within a range of approximately less than one second and approximately one minute, within a range of approximately less than one second and approximately thirty seconds, within a range of approximately less than one second and approximately twenty seconds, within a range of approximately less than one second and approximately ten seconds, and within a range of approximately less than one second and approximately five seconds from the time the first spreadable material is applied 1002 to the pavement surface.

Method 1000 also includes applying 1008 a second spreadable material to the first spreadable material on the pavement surface using a second delivery mechanism of the pavement resurfacing device. The second spreadable material is chosen from a slurry, a microsurfacing material, an emulsion oil, a rejuvenating oil, a hot mix asphalt, a cold mix asphalt, or a chip seal surface. In some embodiments, the second spreadable material is used to coat or seal the first spreadable material, or to achieve desired coloring of the first spreadable material. In one embodiment, the first spreadable material is different from the second spreadable material. In other embodiments, the first spreadable material is the same material as the second spreadable material.

Once the second spreadable material is applied to the first spreadable material, the second spreadable material is then dispersed 1010 using a second dispersing bar of the pavement resurfacing device. In some embodiments, dispersing 1010 the second spreadable material on the pavement surface facilitates a crack filling (or crack sealing) process by urging the second spreadable material into voids, or cracks, in the pavement surface using a second dispersing bar of MADD 100. In other embodiments, dispersing 1010 facilitates uniform spreading of the second material to allow a layering effect with subsequently applied materials.

Along with the first delivery mechanism and the first dispersing bar, the second delivery mechanism and the second dispersing bar are also both are components of the pavement re-surfacing device (MADD 100) and are dragged behind a single mobile device, such as a truck, as a component of MADD 100. As such, the second spreadable material is applied 1008 and dispersed 1010 on the first spreadable material in a single pass of the mobile device over the pavement surface. More specifically, the second able material is applied 1008 and dispersed 1010 on the first spreadable material in the same pass over the pavement surface as when the first spreadable material is applied 1002 and dispersed 1004.

As described above, the second spreadable material is applied 1008 to the pavement surface by the second delivery mechanism within a range of approximately less than one second and approximately two minutes from the time the first spreadable material is dispersed 1004 by the first dispersing bar on the pavement surface. More specifically, the second spreadable material is applied 1008 by second delivery mechanism within a range of approximately less than one second and approximately two minutes from the time the first spreadable material is dispersed 1004 on the pavement surface. Even more specifically, the second spreadable material is applied 1008 by the second delivery mechanism within a range of approximately less than one second and approximately one minute, within a range of approximately less than one second and approximately thirty seconds, within a range of approximately less than one second and approximately twenty seconds, within a range of approximately less than one second and approximately ten seconds, and within a range of approximately less than one second and approximately five seconds from the time the first spreadable material is dispersed 1004 on the pavement surface.

Optionally, method 1000 also includes applying 1006 a third spreadable material to the first spreadable material on the pavement surface using a third delivery mechanism of the pavement resurfacing device prior to applying 1008 the second spreadable material with the second delivery mechanism. In such embodiments, the third spreadable material includes a fiber material. Alternatively, in other embodiments, the third spreadable material is applied 1006 to the second spreadable material on the pavement surface using a third delivery mechanism of the pavement resurfacing device after to applying 1008 the second spreadable material to the first spreadable material. Additionally, in some embodiments, the re-surfaced pavement is textured 1012 using a finishing bar of the pavement re-surfacing device to achieve a surface texture of the re-surfaced pavement. For example, texturing 1012 may achieve a surface texture that provides an enhanced driving surface when the re-surfaced pavement is a roadway.

The method and systems described herein facilitate re-surfacing a pavement surface. Specifically, the method and systems for re-surfacing as described above facilitate applying a uniform layer of slurry material to a pavement surface using a material dispersal device configured to follow the contour of the pavement surface. In some embodiments, the re-surfacing material is a micro-surfacing material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for re-surfacing a pavement surface, said system comprising:
    a conduit configured to transfer a resurfacing material;
    a material application and dispersal device (MADD) coupled in flow communication said conduit, said MADD comprising at least one material application mechanism (MAM) coupled in flow communication with said conduit, wherein said at least one MAM comprises a cavity defined therein and a bottom opening in flow communication with said cavity, wherein said at least one MAM includes a member that outlines said bottom opening and is configured to contact the pavement surface;
    at least one biasing element coupled between said MADD and said at least one MAM, said at least one biasing element configured to provide a downward biasing force to said at least one MAM such that the at least one biasing element causes said at least one MAM to apply a downward force on the pavement surface; and
    a pressurization device coupled in flow communication with said conduit and said MADD, said pressurization device is configured to channel the resurfacing material into said cavity and to generate a positive pressure within said cavity, wherein the positive pressure generated by said pressurization device within said cavity forces the resurfacing material onto the pavement surface.

2. The system in accordance with claim 1 wherein said MADD further comprises a frame comprising at least one first support member and a plurality of second support members coupled to said at least one first support member, said at least one MAM coupled to said at least one first support member.

3. The system in accordance with claim 2 wherein said at least one biasing element is coupled between said at least one first support member and said at least one MAM.

4. The system in accordance with claim 1 wherein said at least one MAM comprises a plurality of MAMs and said MADD further comprises a plurality of connecting links configured to pivotally connect adjacent MAMs of said plurality of MAMs.

5. The system in accordance with claim 4 wherein said connecting links couple adjacent MAMs in flow communication to enable the resurfacing material to flow through said plurality of MAMs.

6. The system in accordance with claim 4 wherein each MAM of said plurality of MAMs comprises a connecting link inlet configured to receive a flow of resurfacing material therein and a connecting link outlet configured to discharge a portion of the flow of resurfacing material therethrough.

7. The system in accordance with claim 4 wherein said plurality of MAMs comprises a first MAM defining a first cavity therein and a second MAM defining a second cavity therein, wherein said connecting links couple said first cavity in flow communication with said second cavity.

8. The system in accordance with claim 4 wherein each MAM of said plurality of MAMs includes a resurfacing material inlet and a resurfacing material outlet, wherein said resurfacing material inlet and outlet are spaced from said plurality of connecting links.

9. The system in accordance with claim 1 wherein said at least one MAM comprises a ball valve configured to deliver the resurfacing material to the pavement surface.

10. The system in accordance with claim 1 wherein said at least one MAM comprises a dispersing element.

11. The system for re-surfacing in accordance with claim 1 wherein said member is configured to form a seal between said at least one MAM and the pavement surface such that the positive pressure with said at least one MAM is maintained.

12. The system in accordance with claim 11 wherein said member comprises a resilient material such that said member maintains continuous contact with the pavement surface.

13. The system in accordance with claim 12 wherein said resilient material comprises at least one of rubber, plastic, and natural or synthetic fibers.

14. The system in accordance with claim 11 wherein said member comprises at least one of a unitary component, a plurality of strips, and a plurality of bristles.

15. The system in accordance with claim 11 wherein said pressurization device comprises a pump.

16. A material application dispersing device (MADD) for use with a re-surfacing system for re-surfacing a pavement surface, said MADD comprising:
a frame comprising:
at least one first support member; and
a plurality of second support members coupled to said at least one first support member;
at least one material application mechanism (MAM) coupled to said at least one first support member, wherein said at least one MAM comprises:
a vessel comprising a plurality of walls that define a cavity and a bottom opening in flow communication with said cavity;
a member coupled to said vessel, wherein said member forms a complete border around said bottom opening; and
an inlet coupled in flow communication with a source of resurfacing material, said inlet configured to channel the resurfacing material to said cavity, wherein a positive pressure is generated within said cavity, wherein the positive pressure builds up within said cavity through said inlet and injects the resurfacing material into cracks in the pavement surface through said bottom opening; and
at least one biasing element coupled between said at least one first support member and said at least one MAM, wherein said at least one biasing element is directly coupled to said at least one MAM such that said at least one biasing element is in physical contact with said at least one MAM, said at least one biasing element configured to provide a downward biasing force to said at least one MAM such that said biasing element causes said MAM to apply a downward force on the pavement surface.

17. The MADD in accordance with claim 16 wherein said at least one MAM comprises a plurality of MAMs and said MADD further comprises a plurality of connecting links configured to pivotally connect adjacent MAMs of said plurality of MAMs.

18. The MADD in accordance with claim 17 wherein said connecting links couple adjacent MAMs in flow communication to enable the resurfacing material to flow through said plurality of MAMs.

19. The MADD in accordance with claim 17 wherein said plurality of MAMs comprises a first MAM defining a first cavity therein and a second MAM defining a second cavity therein, wherein said connecting links couple said first cavity in flow communication with said second cavity.

20. The MADD in accordance with claim 16 wherein said at least one MAM comprises a dispersing element.

21. The MADD in accordance with claim 16 wherein said member is configured to form a seal between said at least one MAM and the pavement surface such that the positive pressure with said at least one MAM is maintained.

22. The MADD in accordance with claim 16 wherein said member comprises a resilient material such that said member maintains continuous contact with the pavement surface.

23. The MADD in accordance with claim 22 wherein said resilient material comprises at least one of rubber, plastic, and natural or synthetic fibers.

24. The MADD in accordance with claim 16 wherein said member comprises at least one of a unitary component, a plurality of strips, and a plurality of bristles.

25. The MADD in accordance with claim 16 wherein each MAM is coupled in flow communication with a pressurization device configured to generate the positive pressure with MAMs.

26. A method for re-surfacing a pavement surface using a pavement resurfacing device, said method comprising:
applying a first spreadable material to the pavement surface using a first delivery mechanism of the pavement resurfacing device, wherein the first spreadable material is a resurfacing material;
biasing the first delivery mechanism using at least one biasing element, wherein the biasing element provides a downward force on the first delivery mechanism such that the biasing element causes the first delivery mechanism to apply a downward force on the pavement surface to maintain the first delivery mechanism in continuous contact with the pavement surface;

dispersing the first spreadable material on the pavement surface using a first dispersing bar of the pavement resurfacing device; and applying a second spreadable material to the first spreadable material on the pavement surface using a second delivery mechanism of the pavement resurfacing device, wherein the second spreadable material is a resurfacing material, wherein the step of applying the second spreadable material is performed after the step of dispersing the first spreadable material.

27. The method in accordance with claim 26 further comprising dispensing the second spreadable material on the pavement surface using a second dispersing bar of the pavement resurfacing device, wherein the second dispersing bar is configured to apply substantially uniform pressure across the pavement surface.

28. The method in accordance with claim 26 further comprising applying a third spreadable material to the second spreadable material on the pavement surface using a third delivery mechanism of the pavement resurfacing device.

29. The method in accordance with claim 26 further comprising applying a third spreadable material to the first spreadable material on the pavement surface using a third delivery mechanism of the pavement resurfacing device, wherein the third spreadable material is applied prior to applying the second spreadable material.

30. The method in accordance with claim 29, wherein the third spreadable material comprises a fiber material.

31. The method in accordance with claim 26 further comprising texturing the re-surfaced pavement surface using a finishing bar to create a surface texture.

32. The method in accordance with claim 26, wherein the first spreadable material is different than the second spreadable material.

33. The method in accordance with claim 26, wherein the first spreadable material is the same as the second spreadable material.

34. The method in accordance with claim 26, wherein the first spreadable material comprises at least one of a slurry, bitumen, a pavement rejuvenating material, a seal coat, a microsurfacing material, emulsion oil, chip seal, aggregate, hot mix asphalt, warm mix asphalt, and cold mix asphalt.

35. The method in accordance with claim 26, wherein the second spreadable material comprises at least one of a slurry, bitumen, a pavement rejuvenating material, a seal coat, a microsurfacing material, emulsion oil, chip seal, aggregate, hot mix asphalt, warm mix asphalt, and cold mix asphalt.

36. A method for re-surfacing a pavement surface, said method comprising:
applying a first spreadable material to the pavement surface using a first delivery mechanism, wherein the first spreadable material is a resurfacing material;
biasing the first delivery mechanism using at least one biasing element, wherein the biasing element provides a downward force on the first delivery mechanism to maintain the first delivery mechanism in continuous contact with the pavement surface such that the biasing element causes the first delivery mechanism to apply a downward force on the pavement surface;
dispersing the first spreadable material on the pavement surface using a first dispersing bar, wherein the first dispersing bar is configured to disperse the first spreadable material across the pavement surface, wherein the first spreadable material is dispersed within a range of approximately less than 1 second to approximately 2 minutes after applying the first spreadable material; and applying a second spreadable material to the first spreadable material on the pavement surface using a second delivery mechanism, wherein the second spreadable material is a resurfacing material, wherein the second spreadable material is applied within a range of approximately less than 1 second to approximately 2 minutes after dispersing the first spreadable material.

37. The method in accordance with claim 36 further comprising dispensing the second spreadable material on the pavement surface using a second dispersing bar of the pavement resurfacing device, wherein the second dispersing bar is configured to apply substantially uniform pressure across the pavement surface.

38. The method in accordance with claim 36 further comprising applying a third spreadable material to the second spreadable material on the pavement surface using a third delivery mechanism of the pavement resurfacing device.

39. The method in accordance with claim 36 further comprising applying a third spreadable material to the first spreadable material on the pavement surface using a third delivery mechanism of the pavement resurfacing device, wherein the third spreadable material is applied prior to applying the second spreadable material.

40. The method in accordance with claim 39, wherein the third spreadable material comprises a fiber material.

41. The method in accordance with claim 36 further comprising texturing the re-surfaced pavement surface using a finishing bar to create a surface texture.

42. The method in accordance with claim 36, wherein the first spreadable material is different than the second spreadable material.

43. The method in accordance with claim 36, wherein the first spreadable material is the same as the second spreadable material.

44. The method in accordance with claim 36, wherein the first spreadable material comprises at least one of a slurry, bitumen, a pavement rejuvenating material, a seal coat, a microsurfacing material, emulsion oil, chip seal, aggregate, hot mix asphalt, warm mix asphalt, and cold mix asphalt.

45. The method in accordance with claim 36, wherein the second spreadable material comprises at least one of a slurry, bitumen, a pavement rejuvenating material, a seal coat, a microsurfacing material, emulsion oil, chip seal, aggregate, hot mix asphalt, warm mix asphalt, and cold mix asphalt.

46. The method in accordance with claim 36, wherein the first spreadable material is dispersed within a range of approximately less than 1 second to approximately 1 minute after applying the first spreadable material.

47. The method in accordance with claim 46, wherein the first spreadable material is dispersed within a range of approximately less than 1 second to approximately 30 seconds after applying the first spreadable material.

48. The method in accordance with claim 47, wherein the first spreadable material is dispersed within a range of approximately less than 1 second to approximately 20 seconds after applying the first spreadable material.

49. The method in accordance with claim 48, wherein the first spreadable material is dispersed within a range of approximately less than 1 second to approximately 10 seconds after applying the first spreadable material.

50. The method in accordance with claim 49, wherein the first spreadable material is dispersed within a range of approximately less than 1 second to approximately 5 seconds after applying the first spreadable material.

51. The method in accordance with claim 36, wherein the second spreadable material is applied within a range of approximately less than 1 second to approximately 1 minute after dispersing the first spreadable material.

52. The method in accordance with claim 51, wherein the second spreadable material is applied within a range of approximately less than 1 second to approximately 30 seconds after dispersing the first spreadable material.

53. The method in accordance with claim 52, wherein the second spreadable material is applied within a range of approximately less than 1 second to approximately 20 seconds after dispersing the first spreadable material.

54. The method in accordance with claim 53, wherein the second spreadable material is applied within a range of approximately less than 1 second to approximately 10 seconds after dispersing the first spreadable material.

55. The method in accordance with claim 54, wherein the second spreadable material is applied within a range of approximately less than 1 second to approximately 5 seconds after dispersing the first spreadable material.

56. The system in accordance with claim 1 wherein said at least one MAM is in contact with the pavement surface.

57. The MADD in accordance with claim 16 wherein said plurality of walls comprises four walls that form a box that defines said cavity.

58. The method in accordance with claim 26 wherein the first dispersing bar is configured to apply substantially uniform pressure across the pavement surface.

59. The method in accordance with claim 26, wherein the applying the first spreadable material, dispersing the first spreadable material, and applying the second spreadable material steps are performed in a single pass of the pavement resurfacing device over the pavement surface.

60. The method in accordance with claim 36, wherein the first dispersing bar is configured to apply substantially uniform pressure across the pavement surface.

61. A method for re-surfacing a pavement surface using a pavement resurfacing device, said method comprising:
  applying a first resurfacing material to the pavement surface using a first delivery mechanism of the pavement resurfacing device;
  biasing the first delivery mechanism using at least one biasing element, wherein the biasing element provides a downward force on the first delivery mechanism to maintain the first delivery mechanism in continuous contact with the pavement surface such that the biasing element causes the first delivery mechanism to apply a downward force on the pavement surface;
  dispersing the first resurfacing material on the pavement surface; and
  applying a second resurfacing material to the first resurfacing material on the pavement surface using a second delivery mechanism of the pavement resurfacing device.

62. The method in accordance with claim 61, wherein the step of applying the second spreadable material is performed after the step of dispersing the first spreadable material, and wherein the first delivery mechanism is separated from the second delivery mechanism by the first dispersing bar.

63. The method in accordance with claim 61, wherein the applying the first spreadable material, dispersing the first spreadable material, and applying the second spreadable material steps are performed in a single pass of the pavement resurfacing device over the pavement surface.

64. The method in accordance with claim 61, wherein dispersing the first resurfacing material comprises dispersing the first resurfacing material using a first dispersing bar of the pavement resurfacing device.

65. The method in accordance with claim 64, wherein the first dispersing bar is configured to apply substantially uniform pressure across the pavement surface.

66. The method in accordance with claim 61, wherein the resurfacing materials is at least one of a slurry, bitumen, a pavement rejuvenating material, a seal coat, a microsurfacing material, emulsion oil, chip seal, aggregate, hot mix asphalt, warm mix asphalt, and cold mix asphalt.

67. The method in accordance with claim 61, wherein applying a first resurfacing material comprises creating a positive pressure within the first resurfacing material.

68. The system in accordance with claim 1, wherein said member comprises a sealing element.

69. A system for re-surfacing a pavement surface, said system comprising:
  a conduit configured to transfer a resurfacing material;
  a material application and dispersal device (MADD) coupled in flow communication said conduit, said MADD comprising at least one material application mechanism (MAM) coupled in flow communication with said conduit, wherein said at least one MAM comprises a cavity defined therein and a bottom opening in flow communication with said cavity, wherein said at least one MAM includes a member that outlines said bottom opening and is configured to contact the pavement surface, wherein said at least one MAM comprises a plurality of MAMs and said MADD further comprises at least one connecting link configured to pivotally connect adjacent MAMs of said plurality of MAMs; and
  a pressurization device coupled in flow communication with said conduit and said MADD, said pressurization device is configured to channel the resurfacing material into said cavity and to generate a positive pressure within said cavity, wherein the positive pressure generated by said pressurization device within said cavity forces the resurfacing material into cracks formed in the pavement surface.

70. A method for re-surfacing a pavement surface using a pavement resurfacing device, said method comprising:
  applying a first spreadable material to the pavement surface using a first delivery mechanism of the pavement resurfacing device, wherein the first spreadable material is a resurfacing material;
  biasing the first delivery mechanism using at least one biasing element, wherein the biasing element provides a downward force on the first delivery mechanism to maintain the first delivery mechanism in continuous contact with the pavement resurfacing surface such that the biasing element causes the first delivery mechanism to apply a downward force on the pavement surface;
  dispersing the first spreadable material on the pavement surface using a plurality of dispersing bars of the pavement resurfacing device, wherein each dispersing bar of the plurality of dispersing bars is configured to apply substantially uniform pressure across the pavement surface; and
  applying a second spreadable material to the first spreadable material on the pavement surface using a second delivery mechanism of the pavement resurfacing device, wherein the second spreadable material is a resurfacing material, wherein the step of applying the second spreadable material is performed after the step of dispersing the first spreadable material.

71. The MADD in accordance with claim 1 further comprising a dispersing element configured to disperse the resurfacing material on the pavement surface after application by said MAM, wherein said dispersing element comprises at least one of a unitary component, a plurality of strips, and a plurality of bristles.

72. The MADD in accordance with claim 16 further comprising a dispersing element configured to disperse the resurfacing material on the pavement surface after application by said MAM, wherein said dispersing element comprises at least one of a unitary component, a plurality of strips, and a plurality of bristles.

73. The MADD in accordance with claim 10 further comprising a second dispersing element configured to disperse the resurfacing material on the pavement surface after dispersal by said MAM, wherein said second dispersing element comprises at least one of a unitary component, a plurality of strips, and a plurality of bristles.

74. A system for re-surfacing a pavement surface, said system comprising:
   a conduit configured to transfer a resurfacing material;
   at least two material application mechanisms (MAMs) coupled in flow communication with said conduit, wherein each of said at least two MAMs comprise a cavity defined therein and a bottom opening in flow communication with said cavity, wherein each of said at least two MAMs includes a member that outlines said bottom opening and is configured to contact the pavement surface;
   a pressurization device coupled in flow communication with said conduit and said MADD, said pressurization device is configured to channel the resurfacing material into said cavity and to generate a positive pressure within said cavity, wherein the positive pressure generated by said pressurization device within said cavity forces the resurfacing material onto the pavement surface.

75. A method for re-surfacing a pavement surface using a pavement resurfacing device, said method comprising:
   providing the pavement resurfacing system of claim 74;
   applying a resurfacing material to the pavement surface using a delivery mechanism of the pavement resurfacing device;
   biasing the delivery mechanism using at least one biasing element, wherein the biasing element provides a downward force on the first delivery mechanism to maintain the delivery mechanism in continuous contact with the pavement surface such that the biasing element causes the first delivery mechanism to apply a downward force on the pavement surface; and dispersing the resurfacing material on the pavement surface.

* * * * *